June 26, 1956 F. S. WALTER 2,752,411
THERMOCOUPLES
Filed Sept. 29, 1954 2 Sheets-Sheet 1
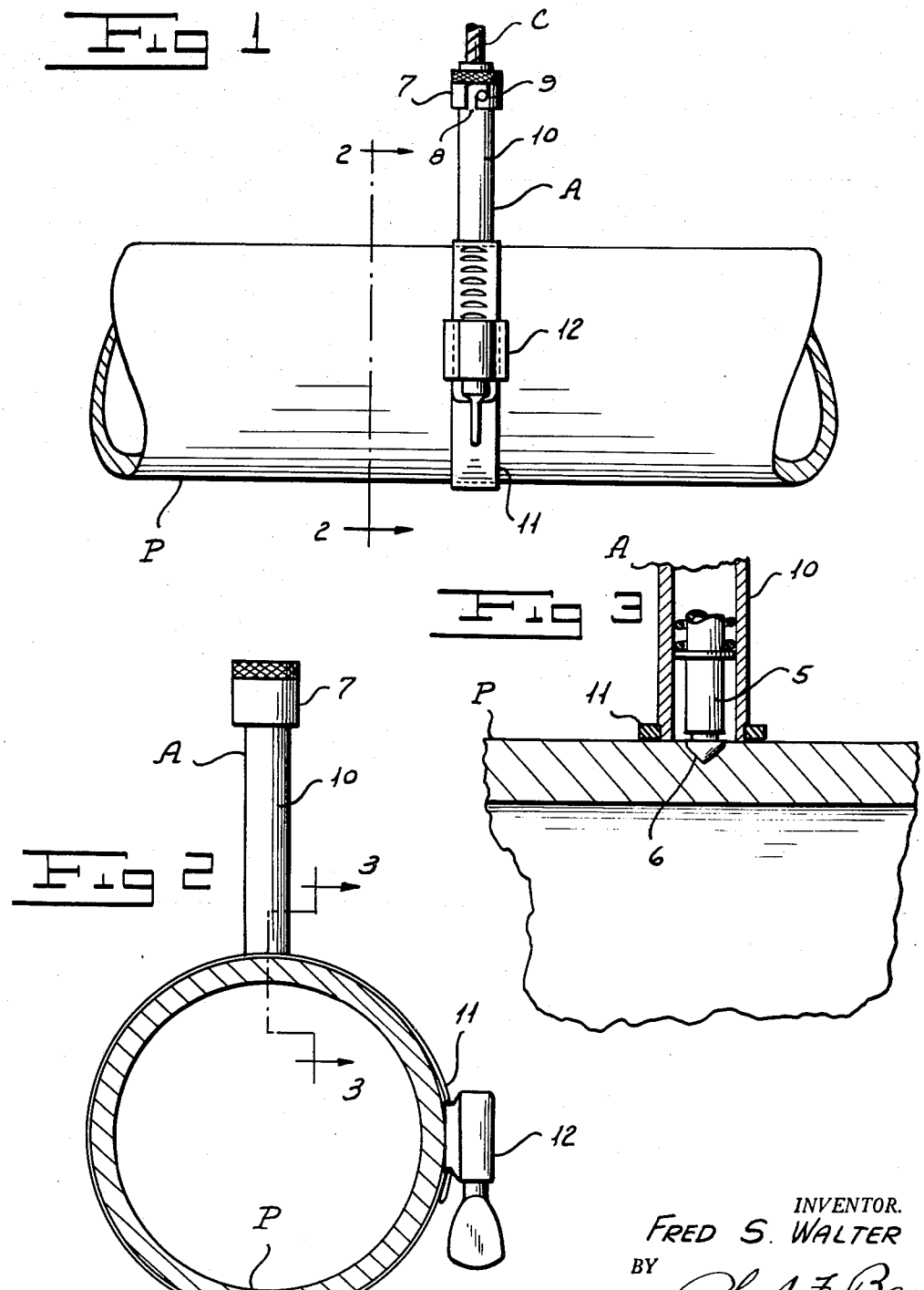
INVENTOR.
FRED S. WALTER
BY
Robert F. Beck
ATTORNEY June 26, 1956  F. S. WALTER  2,752,411
THERMOCOUPLES
Filed Sept. 29, 1954  2 Sheets—Sheet 2
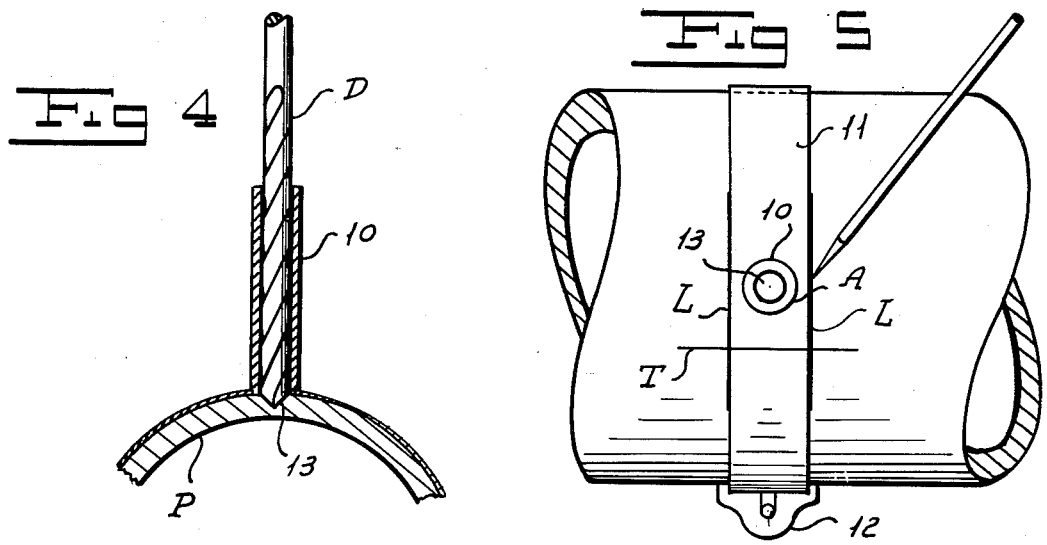
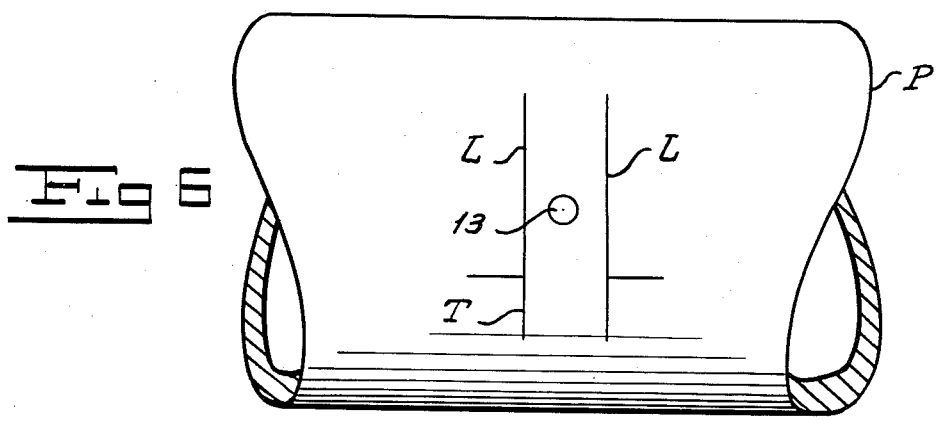
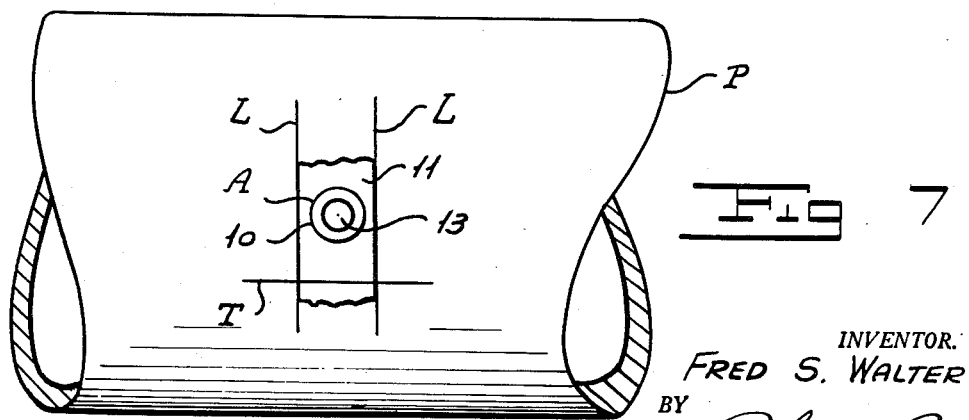
INVENTOR.
FRED S. WALTER
BY Robert F. Beck
ATTORNEY 2,752,411
Patented June 26, 1956

2,752,411

THERMOCOUPLES

Fred S. Walter, Allendale, N. J., assignor to Thermo Electric Co., Inc., a corporation of New Jersey Application September 29, 1954, Serial No. 459,089

1 Claim. (Cl. 136—4)

My invention relates to thermocouples and more particularly to means and a method for insuring an effective and positive jointure of the thermocouple with a selected surface.

One of the objects of my invention is to provide a thermocouple equipped with means for maintaining the contact point or end in fixed relation with a surface and in a manner to insure accurate temperature readings.

Another object of my invention is to provide securing means for securing a thermocouple in contact with a desired surface and in a manner wherein the thermocouple is easily detached from said means to permit its use with other like or similar means if desired.

A further object of my invention is to provide securing means of the foregoing described character which is so constructed and arranged as to constitute a jig for a tool whereby the surface may be spot faced or treated to receive the aforementioned contact point or end.

An important object of my invention is to provide a method of spot facing or treating the surface and denoting the location thereof for subsequently receiving the contact point or end of the thermocouple.

A highly important object of my invention is to provide a thermocouple equipped with securing means which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a side elevation of a section of pipe having my invention applied thereto.

Figure 2 is a sectional view taken on the line 2—2 of Figure 1.

Figure 3 is an enlarged detail sectional view taken on the line 3—3 of Figure 2.

Figure 4 is a sectional view of the adapter and illustrating the same in use as a tool jig.

Figure 5 is a top plan view of the adapter and illustrating the method of denoting or indicating its position on the pipe for receiving the spotting tool or drill.

Figure 6 is a top plan view of the pipe and illustrating the spot facing and scribing thereon.

Figure 7 is a top plan view of the pipe and illustrating the adapter positioned thereon to accord with the scribing to effect correct positioning of the thermocouple with with the spot facing.

In practicing my invention, as illustrated in the drawings, I provide an elongated cylindriform thermocouple 5 having a contact end or point 6 which may be constructed of coin silver. The thermocouple has a spring-pressed cap 7 slidably mounted on its opposite end and which cap is provided with a bayonet slot 8 receiving an outwardly and radially projecting pin 9 fixed to one end of the sleeve 10 of an adapter A. The thermocouple 5 is secured within the sleeve 10 due to the cap which functions to maintain the pin within the locking pocket of the slot 8, an example of a construction of this character being disclosed in U. S. Patent No. 2,493,311. The opposite end of the thermocouple 5 has extending therefrom an electrical cable C or the like leading to suitable instruments or devices.

The adapter A is provided with a clamp comprising a strap or band 11 for embracing a pipe P or the like and which band, between its ends, is fixed to the opposite end of the sleeve 10 which extends through the band. The band is equipped with an adjustable tightening mechanism or device 12 for connecting the ends of the band together and operable for clamping the band about the pipe in fixed relation therewith, examples of tightening devices being disclosed in U. S. Patents Nos. 2,386,629 and 2,395,273.

In use, the band is disposed about the pipe P and clamped thereto by the device 12, whereupon, a drill D is inserted within the sleeve 10 and operated to effect spot facing of the pipe and thus form a seat 13 for the point 6. When the adapter is thus positioned on the pipe, a line L is scribed on each side of the strap or band 11 and a transverse line T inscribed across the band and the lines L as clearly illustrated in Figures 5 to 7 of the drawings. When the position of the adapter is thus denoted, it may be removed to permit cleaning of the seat etc., and subsequently secured to the pipe in identically the same position by reason of the lines L and T, thereby accurately locating the seat 13 with respect to the sleeve. When the adapter is attached to the pipe, the thermocouple 5 is inserted within the sleeve and the cap disposed over the sleeve in connected arrangement with the pin 9 thereby seating the contact point 6 within the seat 13 to establish a positive and effective connection with the pipe.

From the foregoing, it will be apparent that the thermocouple may be used in conjunction with a plurality of adapters secured in other locations and that the adapter may be shifted from one location to another and subsequently relocated in the former locations by reason of the position denoting the lines L and T. It will also be apparent that the sleeve 10 not only functions to receive and maintain the thermocouple in position with respect to the seat 13 but also functions as a jig for the drill D in forming the seat 13. While the adapter is preferably constructed of stainless steel, it is to be understood that other metals may be used if desired. By reason of the adjustable securing device 12, the adapter may be secured to various sizes of pipe within a reasonable range and the band mounted under pipe lagging where desirable.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claim.

What I claim is:

The combination of an elongated band adapted to encircle a pipe, means for adjustably clamping the band about the pipe, said band having an aperture therein, an elongated sleeve surrounding the aperture and extending perpendicularly to the band, said sleeve being fixed at one end to the band and having the opposite end open and with an open passage entirely therethrough for passage of a tool through the sleeve to form a seat in the outer face of the pipe, an elongated thermocouple having a terminal end, said thermocouple and terminal end being of smaller external size than the size of the passage through the sleeve for insertion through the sleeve with the terminal end extending through the aperture in position for engagement with the seat formed in the pipe, said thermocouple extending outwardly through the sleeve to the outer end thereof, and means mounted on the outer end of the sleeve for supporting the thermocouple therein, whereby the band may be applied to the pipe with the sleeve constituting a jig for a tool extended therethrough to form the seat in the outer face of the pipe and thereafter the tool be removed and the thermocouple inserted without removing the band and sleeve from their clamped relation to the pipe.

References Cited in the file of this patent

UNITED STATES PATENTS

| | | |
|---|---|---|
| 2,386,629 | North et al. | Oct. 9, 1945 |
| 2,493,311 | Odell | Jan. 3, 1950 |
| 2,607,808 | Kehoe | Aug. 19, 1952 |

FOREIGN PATENTS

| | | |
|---|---|---|
| 692,436 | Germany | June 19, 1940 |